United States Patent
Um

(10) Patent No.: US 11,263,127 B2
(45) Date of Patent: Mar. 1, 2022

(54) DATA STORAGE DEVICE, METHOD OF OPERATING THE SAME, AND CONTROLLER FOR THE SAME

(71) Applicant: SK hynix Inc., Gyeonggi-do (KR)

(72) Inventor: Gi Pyo Um, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 65 days.

(21) Appl. No.: 16/673,682

(22) Filed: Nov. 4, 2019

(65) Prior Publication Data

US 2021/0042223 A1 Feb. 11, 2021

(30) Foreign Application Priority Data

Aug. 8, 2019 (KR) .................. 10-2019-0096576

(51) Int. Cl.
*G06F 12/02* (2006.01)
*G06F 12/1009* (2016.01)
*G06N 5/04* (2006.01)

(52) U.S. Cl.
CPC ...... *G06F 12/0253* (2013.01); *G06F 12/1009* (2013.01); *G06N 5/04* (2013.01); *G06F 2212/1044* (2013.01); *G06F 2212/657* (2013.01)

(58) Field of Classification Search
CPC ............. G06F 12/0253; G06F 12/1009; G06F 2212/1044; G06F 2212/657
See application file for complete search history.

(56) References Cited

U.S. PATENT DOCUMENTS

| | | | |
|---|---|---|---|
| 2011/0283049 A1* | 11/2011 | Kang | G11C 16/16 711/103 |
| 2013/0019057 A1* | 1/2013 | Stephens | G06F 3/0638 711/103 |
| 2015/0212751 A1* | 7/2015 | Shi | G06F 21/79 711/103 |
| 2016/0124848 A1* | 5/2016 | Bellorado | G06F 12/12 711/103 |
| 2016/0224247 A1* | 8/2016 | Woo | G06F 3/064 |
| 2018/0004650 A1* | 1/2018 | Battaje | G06F 12/0246 |
| 2018/0357013 A1* | 12/2018 | Shi | G06F 3/0659 |
| 2019/0212944 A1* | 7/2019 | Hutchison | G06F 11/1448 |
| 2019/0278484 A1* | 9/2019 | Tatsumi | G06F 12/0253 |
| 2020/0089648 A1* | 3/2020 | Klein | G06F 12/0246 |
| 2020/0097403 A1* | 3/2020 | Saxena | G06F 12/0246 |
| 2020/0183830 A1* | 6/2020 | Li | G06F 12/0246 |
| 2020/0210330 A1* | 7/2020 | Muchherla | G06F 12/0253 |
| 2021/0019255 A1* | 1/2021 | Akin | G06F 12/0253 |

FOREIGN PATENT DOCUMENTS

KR  1020160094765  8/2016
KR  101734200  5/2017

* cited by examiner

*Primary Examiner* — Ryan Bertram
(74) *Attorney, Agent, or Firm* — IP&T Group LLP

(57) ABSTRACT

A data storage device may include a storage and a controller for controlling the storage. The controller may include a garbage collection controller. The garbage collection controller may predict whether at least one memory block may be invalidated or not, based on a new write command with respect to a logical address having a previous write record. When the garbage collection controller predicts the invalidation of the at least one memory block, the garbage collection controller may control a garbage collection policy.

15 Claims, 14 Drawing Sheets

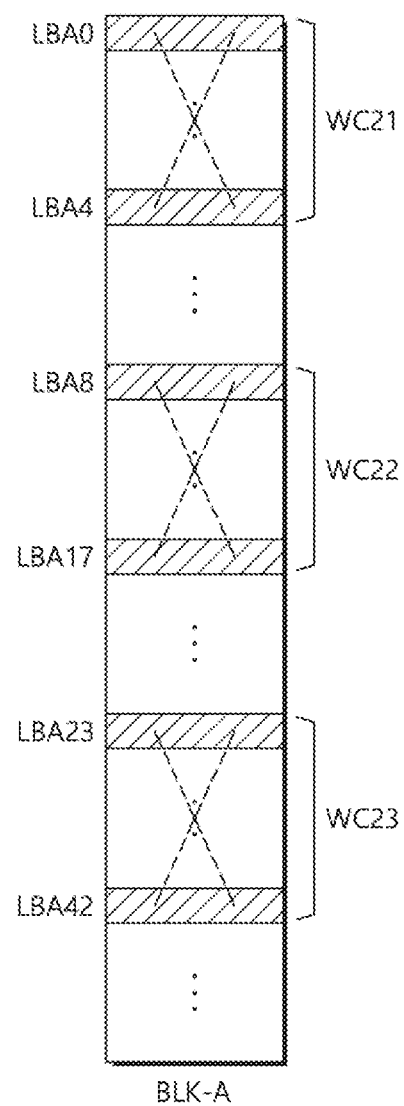

DATA STORAGE DEVICE, METHOD OF OPERATING THE SAME, AND CONTROLLER FOR THE SAME

CROSS-REFERENCE TO RELATED APPLICATION

The present application claims priority under 35 U.S.C. § 119(a) to Korean application number 10-2019-0096576, filed on Aug. 8, 2019, which is incorporated herein by reference in its entirety.

BACKGROUND

1. Technical Field

Various embodiments generally relate to a semiconductor integrated device, more particularly, a data storage device, a method of operating the data storage device, and a controller for the data storage device.

2. Related Art

A data storage device may be electrically connected with a host device to perform data input/output operations in accordance with requests of the host device. In order to store data, the data storage device may use any of various storage media. For example, the data storage device may include a non-volatile memory device such as a flash memory device as the storage medium.

The flash memory device may not perform an overwrite operation or an in-place update operation. Further, the flash memory device may have a read/write unit different from an erase unit. Thus, data inputted by an overwrite request of the host device is not actually overwritten to the flash memory, but is stored in a physical address area different from an area in which data which is inputted by a previous overwrite request was stored. Therefore, it may be required to manage a storage region of the flash memory device by a housekeeping operation such as garbage collection, data migration, wear leveling, or the like.

SUMMARY

In an embodiment of the present disclosure, a data storage device may include a storage; and a controller for controlling the storage, wherein the controller comprises a garbage collection (GC) control component that is configured to predict whether or not at least one memory block is to be invalidated based on a new write command with respect to a logical address having a previous write record, and the GC control component is further configured to adjust a GC policy when the invalidation of the memory block is predicted.

In an embodiment of the present disclosure, a controller for controlling a storage in response to a host device, the controller comprising: a record check component configured to determine a write record based on a map table based on a new write command received from the host device; a prediction component configured to predict whether or not at least one memory block is to be invalidated when the new write command with respect to a logical address has a write record as determined by the record check component; and a policy adjustment component configured to adjust a garbage collection (GC) policy when the prediction component predicts the invalidation of the at least one memory block.

In an embodiment of the present disclosure, according to a method of operating a data storage device including a storage and a controller for controlling the storage, the method comprising: determining, by the controller, whether or not a new write command corresponds to a write request with respect to a logical address having a previous write record based on the new write command provided from a host device; predicting, by the controller, whether or not at least one memory block is to be invalidated when the new write command corresponds to the write request with respect to the logical address having the previous write record; and adjusting, by the controller, a garbage collection (GC) policy when the invalidation of the at least one memory block is predicted.

In an embodiment of the present disclosure, according to a method of operating a data storage device including parsing a write command to extract a logical address and data associated with the write command; predicting whether or not a memory block is to be invalidated based on at least one characteristic of the data associated with the write command; and adjusting at least one aspect of a garbage collection (GC) operation when it is predicted that the memory block is to be invalidated.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIGS. 9A to 9C are diagrams illustrating invalidation principles of a memory block in accordance with an embodiment;

DETAILED DESCRIPTION

Various embodiments of the present invention are described in greater detail with reference to the accompanying drawings. The drawings are schematic illustrations of various structures, components and operations. However, the described embodiments should not be construed as being limited to the particular configurations, arrangements or details illustrated herein but may include other configurations and arrangements which do not depart from the spirit and scope of the present invention as defined in the appended claims.

Although a few embodiments of the present invention are shown and described, it will be appreciated by those of ordinary skill in the art in light of the present disclosure that changes may be made in these embodiments without departing from the principles and spirit of the present invention. Also, throughout the specification, reference to "an embodiment" or the like is not necessarily to only one embodiment, and different references to any such phrase are not necessarily to the same embodiment(s).

Also, open-ended terms, such as "comprising" and "including" are intended to refer to the stated elements or steps in a non-exclusive manner, meaning that other elements or steps may be combined with the stated elements or steps. Similarly, a singular reference, e.g., "a" or "an," is intended to include the plural, unless the context clearly indicates otherwise.

Figure 1:
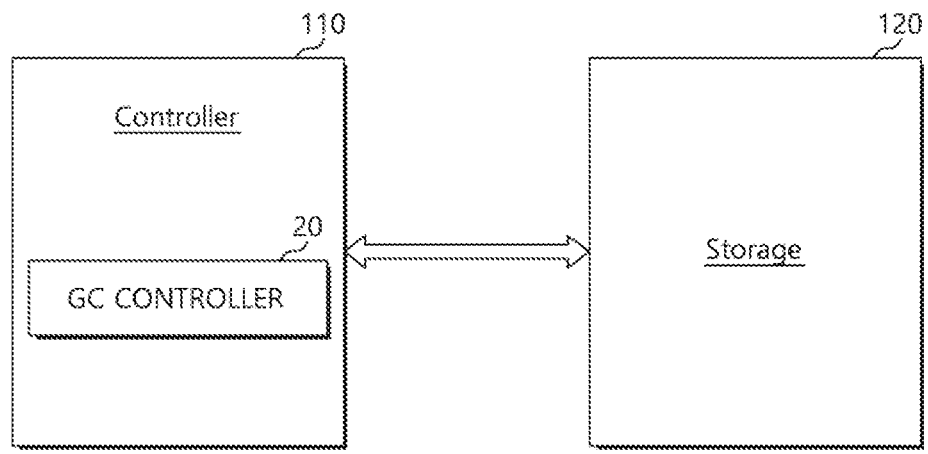
FIG. 1 is a diagram illustrating a data storage device in accordance with an embodiment.

FIG. 1 is a view illustrating a data storage device in accordance with an embodiment.

Referring to FIG. 1, a data storage device 10 of an embodiment may include a controller 110 and a storage 120.

The controller 110 may control the storage 120 in response to requests of a host device. For example, the controller 110 may program data in the storage 120 in accordance with a program (write) request of the host device. The controller 110 may provide the host device with data in the storage 120 in response to a read request of the host device.

The storage 120 may write the data and output the written data under control of the controller 110. In an embodiment, the storage 120 may be any of various non-volatile memory devices, such as an electrically erasable and programmable ROM (EEPROM), a NAND flash memory, a NOR flash memory, a phase change RAM (PRAM), a resistive RAM (ReRAM), a ferroelectric RAM (FRAM), a spin torque transfer magnetic RAM (STT-MRAM), etc. The storage 120 may include a plurality of dies, a plurality of chips, or a plurality of packages. Further, the storage 120 may be operated using single level cells, each storing one bit of data, or using multi-level cells, each storing a plurality of bits of data.

The controller 110 may include a GC controller 20. The GC controller 20 may control a garbage collection (GC) policy in response to a command, particularly, a write command provided from the host device.

In an embodiment, in providing a new write command with respect to a logical address having a previous write record (e.g., a logical address having been associated with a previous write command), the GC controller 20 may control the GC policy when an invalidation of at least one memory block may be predicted.

Figure 2:
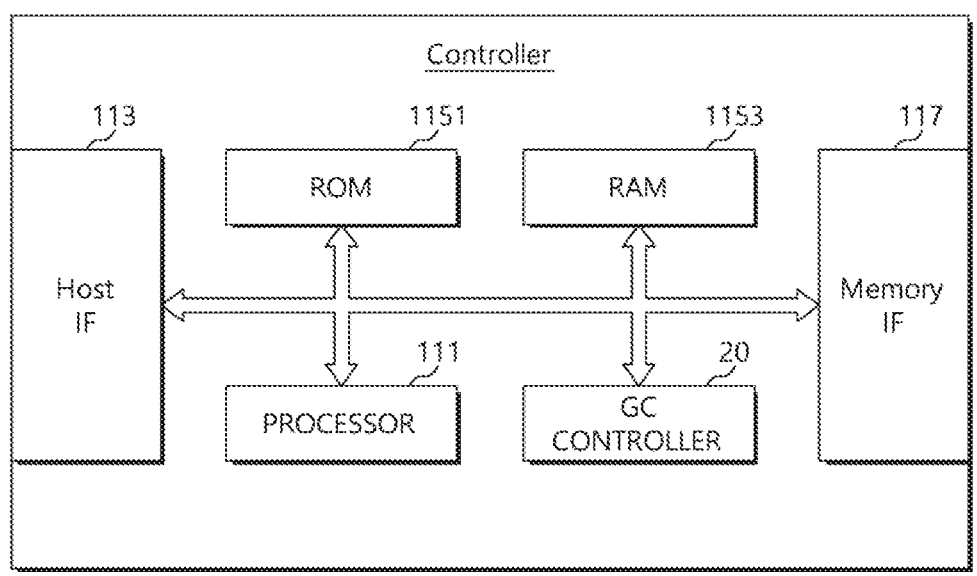
FIG. 2 is a diagram illustrating a controller in accordance with an embodiment.

FIG. 2 is a diagram illustrating a controller in accordance with an embodiment.

Referring to FIG. 2, the controller 110 may include a processor 111, a host interface 113, a ROM 1151, a RAM 1153, a memory interface 119 and the GC controller 20.

The processor 111 may transmit various control information, which may be used for a read operation or a write operation of data with respect to the storage 120, to the host interface 113, the RAM 1153, the memory interface 119 and the GC controller 20. In an embodiment, the processor 111 may be operated in accordance with firmware provided for various operations of the data storage device 10. The processor 111 may be implemented as a combination of hardware and software, with the latter being executed to perform a function of a flash translation layer (FTL) including various functions for managing the storage 120.

The FTL may have a function for providing a garbage collection, an address mapping, a wear leveling, and other such operations, a function for managing properties of each of memory blocks in the storage 120, an ECC (error check and correction) function for detecting and correcting errors read from the storage 120. The FTL may be operated in accordance with control policies of the GC controller in performing the garbage collection.

The host interface 113 may receive a command and a clock signal from the host device in accordance with the controls of the processor 111. The host interface 113 may provide communication channels for controlling input/output of the data. The host interface 113 may provide a physical connection between the host device and the data storage device 10. The host interface 113 may be interfaced with the data storage device 10 by corresponding to a bus format of the host device. The bus format of the host device may include at least one of standard interface protocols, such as a secure digital, a universal serial bus (USB), a multimedia card (MMC), an embedded MMC (eMMC), a personal computer memory card international association (PCMCIA), a parallel advanced technology attachment (PATA), a serial advanced technology attachment (SATA), a small component interconnection (PCI), a PCI express (PCI-E), a universal flash storage (UFS), etc.

The ROM 1151 may store program codes such as firmware or software required for operating the controller 110, and code data used by the program codes.

The RAM 1153 may store data for operating the controller 110 and data generated by the controller 110.

The processor 111 may load boot codes which are in the storage 120 or the ROM 1151 into the RAM 1153 at a booting operation, to control the booting operation of the data storage device 10.

The memory interface 119 may provide communication channels through which signals may be transmitted between the controller 110 and the storage 120.

In an embodiment, in providing the new write command with respect to the logical address having the previous write record, the GC controller 20 may control the GC policy when the invalidation of at least one memory block may be predicted.

In an embodiment, the GC controller 20 may determine a write record based on a map table. For example, when a write command with respect to a logical address, which may be effectively maintained in the map table or may be flagged as an unmapped state, is provided to the GC controller 20, the GC controller 20 may determine the write command with respect to the data having the write record.

In an embodiment, when a logical address included in a plurality of sequentially provided write commands are consecutive and a size of data included in the plurality of write commands is no less than a set size, the GC controller 20 may predict the invalidation of the memory block.

In an embodiment, when mapping information with respect to previous write data, particularly, previous write data invalidated (unmapped) by a current write command and an unmapped physical address concentrated on a specific memory block, the GC controller 20 may predict the invalidation of the memory block. The previous write data may be successively written in an area having a set length of the specific memory block or randomly written in an area of no less than a set ratio of the memory block.

In an embodiment, when an overwrite request for processing bulk data having a record invalidated after a writing operation is received by the GC controller 20, the GC controller 20 may predict the invalidation of the memory block in which the overwritten bulk data may be stored.

The prediction condition for invalidating the memory block by the GC controller 20 is not restricted to that described above. The prediction condition of the GC controller 20 may be variously set in accordance with analysis results of commands provided for the overwrite.

Figure 3:
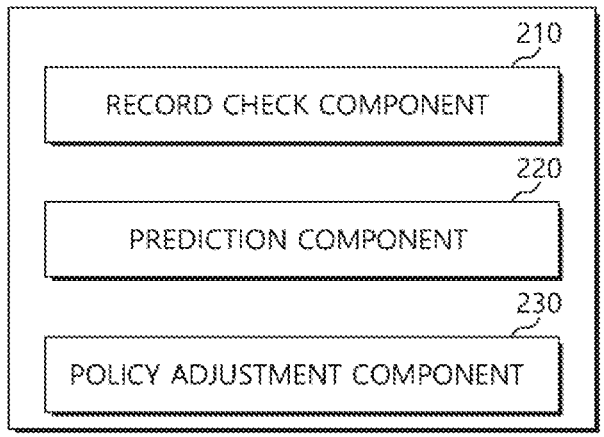
FIG. 3 is a diagram illustrating a map GC controller in accordance with an embodiment.

FIG. 3 is a diagram illustrating a map GC controller in accordance with an embodiment.

Referring to FIG. 3, the GC controller 20 may include a record check component 210, a prediction component 220 and a policy adjustment component 230.

The record check component 210 may determine a write record based on the map table when the write command is provided from the host device.

The map table may be loaded into the ROM 1151 from the storage 120 in the booting operation of the data storage device 10.

A P2L map table prepared using physical addresses as an index may include logical address information corresponding to the index, and flag information corresponding to logical addresses. An L2P map table prepared using logical addresses as an index may include physical address information corresponding to the index.

The P2L map and the L2P map may have the same address mapping information. In order to match the P2L map and the L2P with each other, the L2P map may be updated based on the P2L map.

In an embodiment, when at least one of a write command with respect to an unmapped logical address or a write command which is effectively maintained in the map table, for example, the P2L map, is received by the GC controller 20, the GC controller 20 may determine the inputted write command is an overwrite command.

The prediction component 220 may predict whether or not a memory block in which previous write data may be stored may be invalidated based on a current write command.

In an embodiment, when a logical address included in the plurality of write commands that are sequentially provided are consecutive and a size of data included in the plurality of write commands is no less than a set size, the prediction component 220 may predict the invalidation of the memory block.

In an embodiment, when mapping information with respect to previous write data, particularly, previous write data invalidated (unmapped) by a current write command and an unmapped physical address concentrated on a specific memory block, the prediction component 220 may predict the invalidation of the memory block. The previous unmapped write data may be successively written in an area having a predetermined length of the specific memory block or randomly written in an area of no less than a predetermined ratio of the memory block.

In an embodiment, when an overwrite request for processing bulk data having a record invalidated after a writing operation is received by the prediction component 220 of the GC controller 20, the prediction component 220 may predict the invalidation of the memory block in which the overwritten bulk data may be stored.

When the prediction component 220 predicts the invalidation of the memory block, the policy adjustment component 230 may control GC policies such as execution of the GC, GC trigger condition, numbers of free blocks to be collected by the GC. The execution of the GC may indicate whether the GC operation is performed.

Therefore, the controller 110 may perform the garbage collection in accordance with the GC polices controlled by the policy adjustment component 230.

Figure 4:
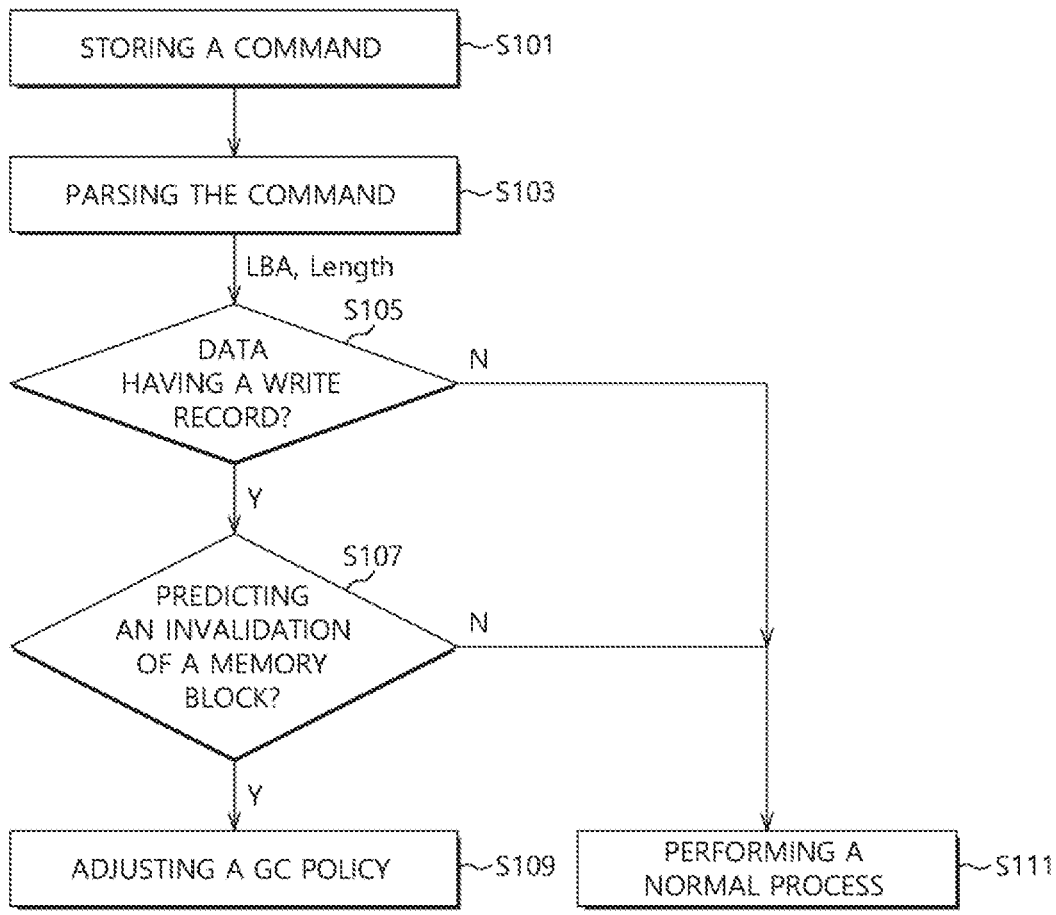
FIG. 4 is a flow chart illustrating a method of operating a data storage device in accordance with an embodiment.

FIG. 4 is a flow chart illustrating a method of operating a data storage device in accordance with an embodiment.

Referring to FIG. 4, in step S101, when the host provides a command, the controller 110 may allocate an empty space in a command register to store the command.

In step S103, the command in the command register may be parsed. When the command is a write command, the command may be parsed to extract a logical address LBA for storing write data and a length of the write data.

In step S105, the GC controller 20 of the controller 110 may determine whether or not the write command corresponds to a write request with respect to the data having the write record, i.e., the overwrite request based on the logical address LBA and the length of the write data.

When the write command corresponds to the overwrite request, in step S107, the GC controller 20 may predict whether the memory block will be invalidated due to the overwrite operation.

When the invalidation of the memory block is predicted, in step S109, the GC controller 20 may change the GC policy. For example, the GC policy may include the execution of the GC, the GC trigger conditions, the numbers of the free blocks collected by the GC, etc., as well as other suitable factor(s).

By changing the GC policy, the controller 110 may perform the garbage collection in accordance with the controlled GC policy.

In contrast, when the write command does not correspond to the overwrite request in step S105, or the invalidation of the memory block is not predicted in step S107, then in step S111, the controller 110 may perform a general command processing.

Figure 5:
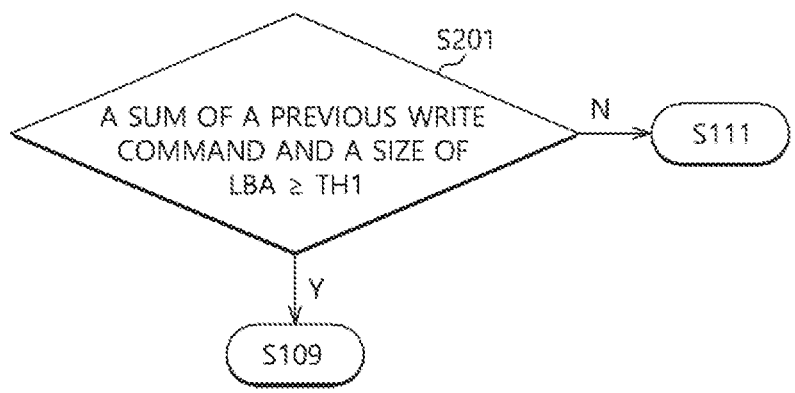
FIG. 5 is a diagram illustrating a method of predicting an invalidation of a memory block in accordance with an embodiment.

FIG. 5 is a diagram illustrating a method of predicting an invalidation of a memory block in accordance with an embodiment, and FIGS. 6A to 6D are diagrams illustrating invalidation principles of a memory block in accordance with an embodiment.

The GC controller 20 may determine whether or not the invalidation of the memory block may be predicted in response to the overwrite request.

In an embodiment, in step S201, when the logical address included in the plurality of write commands that are sequentially provided are consecutive and the size of the data included in the plurality of write commands is no less than the set size TH1, the GC controller 20 may predict the invalidation of the memory block.

Figure 6A:
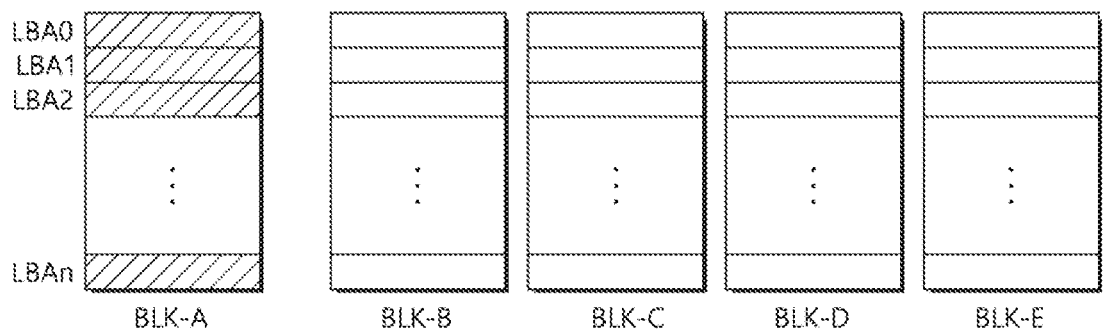
FIGS. 6A to 6D are diagrams illustrating invalidation principles of a memory block in accordance with an embodiment.

Referring to FIG. 6A, a memory block A (BLK-A) of the storage 120 may store data corresponding to logical addresses 0~n (LBA0~LBAn). Further, the storage 120 may include a plurality of free blocks BLK-B, BLK-C, BLK-D and BLK-E.

Figure 6B:
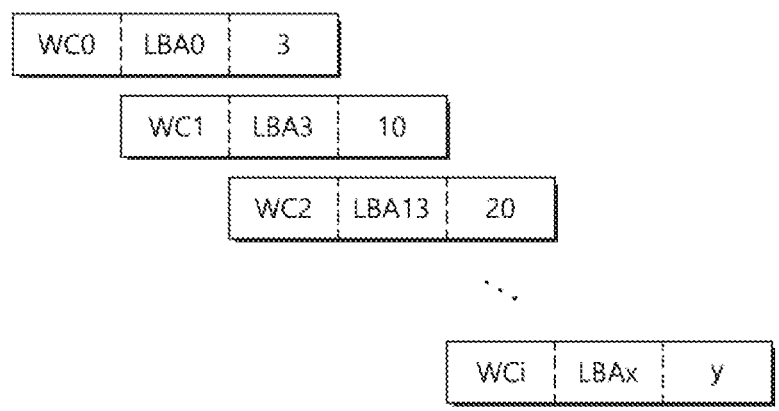

Referring to FIG. 6B, the host device may provide a write command 0 WC0. When a logical address extracted from the write command 0 is LBA0 and a length of data is 3, the GC controller 20 may identify the write command 0 as the overwrite request with respect to the logical addresses LBA0~LBA2.

For example, the GC controller 20 may sequentially receive a write command 1 WC1, a write command 2 WC2, . . . a write commend i WCi. The write command 1 WC1 may be a command for writing data corresponding to length 10 of a logical address LBA3. The write command 2 WC2 may be a command for writing data corresponding to length 20 of a logical address LBA13. The write command i WCi may be a command for writing data corresponding to length y of a logical address LBA1x. The GC controller 20 may identify the write commands 0~1 as sequential write commands for writing data having a length n=3+10+20+y in the logical addresses LBA0~n.

Figure 6C:
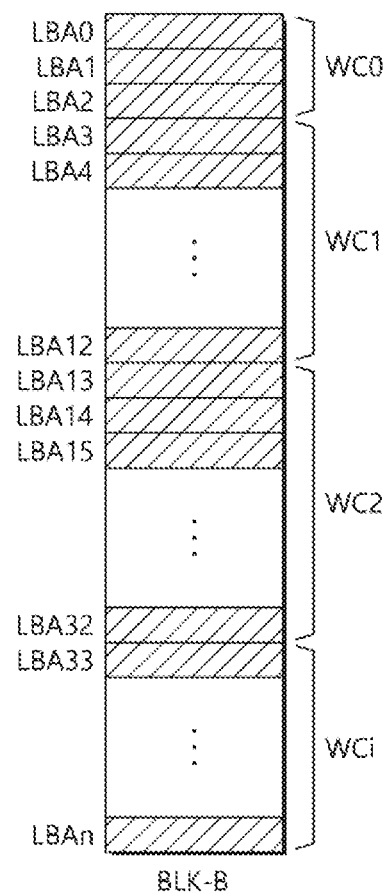

Referring to FIG. 6C, the data associated with the write command 0 may be written in the memory block B BLK-B. The data associated with the write command 1 may be written in the memory block B BLK-B.

Figure 6D:
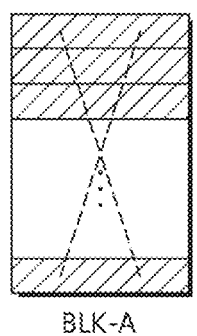

Referring to FIG. 6D, mapping information with respect to data previously written in the memory block A BLK-A may be invalidated.

When all of memory block A is invalidated, the memory block A may be used as the free block. Thus, the free block may be obtained without an additional garbage collection operation.

Therefore, when the previous memory block is invalidated by the current overwrite operation, the GC controller 20 may adjust the GC policy to prevent an unnecessary GC from being performed.

Figure 7:
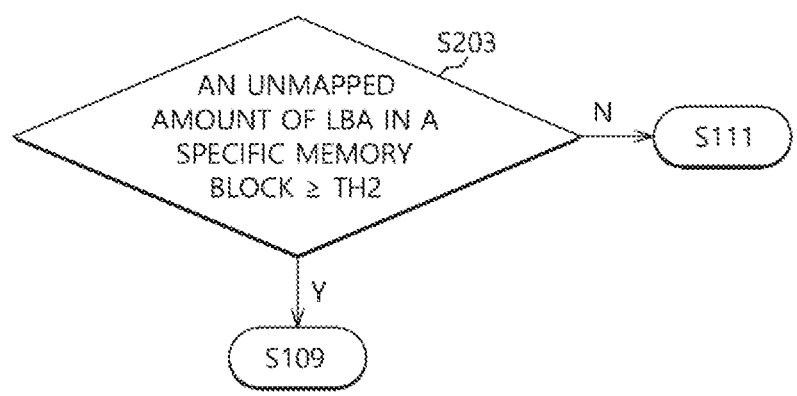
FIG. 7 is a diagram illustrating a method of predicting an invalidation of a memory block in accordance with an embodiment.

FIG. 7 is a diagram illustrating a method of predicting an invalidation of a memory block in accordance with an embodiment.

Referring to FIG. 7, in the case of mapping information with respect to previous write data being invalidated (unmapped) by a current write command, when a physical address of sequentially written data of a length no less than a set length TH21 in a specific memory block is unmapped or a physical address of data which is randomly written in an area no less than a ratio TH22 in the specific memory block, in step S203, the GC controller 20 may predict the invalidation of the memory block.

Figure 8A:
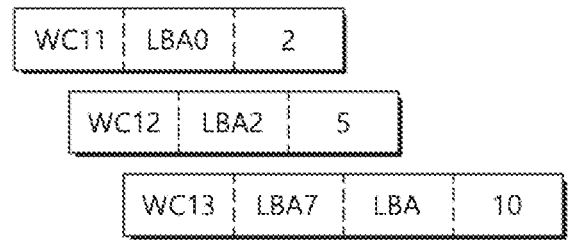
FIGS. 8A to 8C are diagrams illustrating invalidation principles of a memory block in accordance with an embodiment.
Figure 8B:
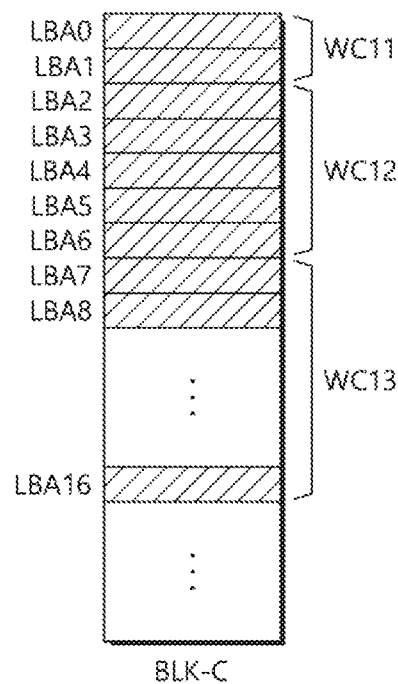
Figure 8C:
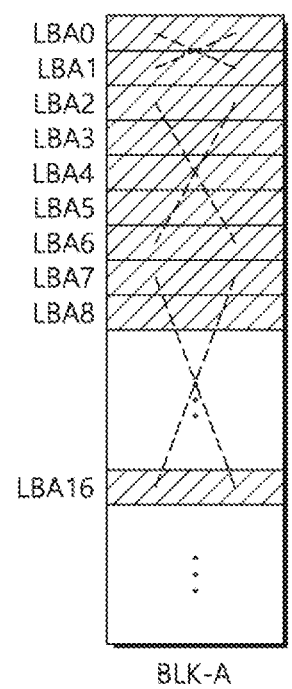

FIGS. 8A to 8C are diagrams illustrating invalidation principles of a memory block in accordance with an embodiment.

Referring back to FIG. 6A, the memory block A (BLK-A) of the storage 120 may store data corresponding to logical addresses 0~n (LBA0~LBAn). Further, the storage 120 may include a plurality of the free blocks BLK-B, BLK-C, BLK-D and BLK-E.

Referring to FIG. 8A, the host device may provide a write command 11 WC11. When a logical address extracted from the write command 11 is LBA0 and a length of data is 2, the GC controller 20 may identify the write command 11 as the overwrite request with respect to the logical addresses LBA0~LBA1.

A write command 12 WC12 for writing data having length of 5, and a write command 13 WC13 for writing data having length of 20 may be sequentially provided to the logical addresses LBA2 and LBA7, respectively, as shown in FIG. 8A.

Referring to FIG. 8B, the data associated with the write command 11 may be written in the memory block C BLK-C. The data associated with the write command 12 may be written in the memory block C BLK-C.

Referring to FIG. 8C, mapping information with respect to data previously written in the memory block A BLK-A corresponding to the logical addresses LBA0~2, mapping information with respect to data previously written in the memory block A BLK-A corresponding to the logical addresses LBA3~6, and mapping information with respect to data previously written in the memory block A BLK-A corresponding to the logical addresses LBA7~16 may be sequentially invalidated.

Therefore, when the previous write data having a length of no less than the set length is successively written in the specific memory block A BLK-A, the physical address unmapped by the overwrite operation may be concentrated on the specific memory block A BLK-A. When an amount of data corresponding to the unmapped logical address is no less than a set value (amount) TH2, non-invalidated data in the memory block A BLK-A may be determined to be invalidated later.

When all of memory block A is invalidated, the memory block A may be used as the free block. Thus, the free block may be obtained without an additional garbage collection operation.

In case the mapping information with respect to the previous write data is invalidated (unmapped) by the overwrite operation in accordance with the plurality of write commands having the successive logical addresses, when the unmapped physical address is concentrated on the specific memory block, the GC controller 20 may predict the invalidation of the specific memory block.

Figure 9A:
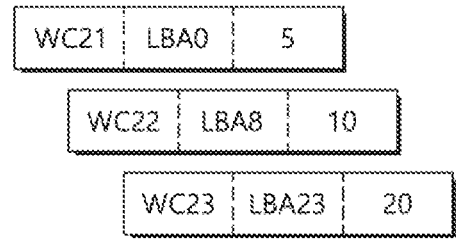
Figure 9B:
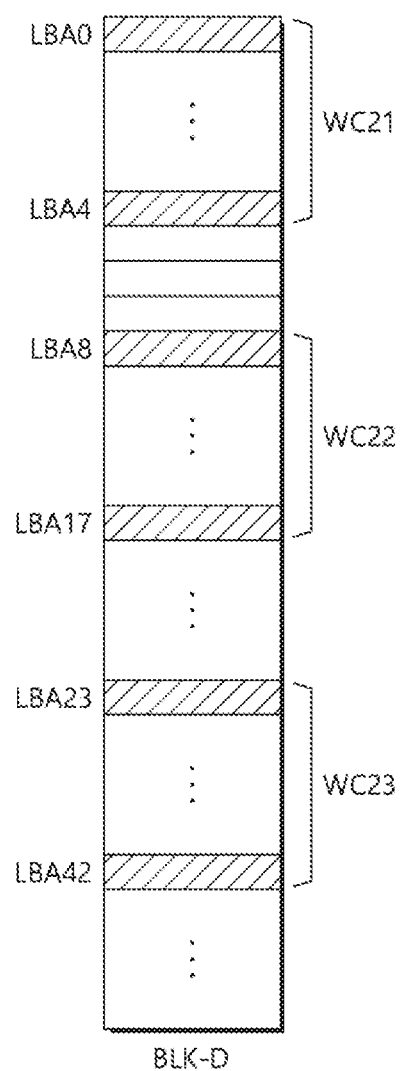

FIGS. 9A to 9C are diagrams illustrating invalidation principles of a memory block in accordance with an embodiment.

Referring to FIG. 6A, the memory block A (BLK-A) of the storage 120 may store data corresponding to logical addresses 0~n (LBA0~LBAn). Further, the storage 120 may include a plurality of the free blocks BLK-B, BLK-C, BLK-D and BLK-E.

Referring to FIG. 9A, the host device may provide a write command 21 WC21. When a logical address extracted from the write command 21 is LBA0 and a length of data is 5, the GC controller 20 may identify the write command 21 as the overwrite request with respect to the logical addresses LBA0~LBA4.

A write command 22 WC22 for writing data having a length of 10, and a write command 23 WC23 for writing data having a length of 20 may be sequentially provided to the logical addresses LBA8 and LBA23, respectively, as shown in FIG. 9A.

Referring to FIG. 9B, the data associated with the write command 21 may be written in the memory block D BLK-D. The data associated with the write command 22 may be written in the memory block D BLK-D.

Referring to FIG. 9C, mapping information with respect to data previously written in the memory block A BLK-A corresponding to the logical addresses LBA0~4, mapping information with respect to data previously written in the memory block A BLK-A corresponding to the logical addresses LBA8~17, and mapping information with respect to data previously written in the memory block A BLK-A corresponding to the logical addresses LBA23~42 may be sequentially invalidated.

Therefore, when the previous write data, which may be invalidated later, is randomly written in an area of no less than the set ratio of the specific memory block A BLK-A, the physical address unmapped by the overwrite may be concentrated on the specific memory block A BLK-A. When an invalidated amount of the data in the memory block A BLK-A, i.e., an unmapped amount of data of the logical address is no less than a set value TH2, non-invalidated data in the memory block A BLK-A may be determined to be invalidated later.

When all of memory block A is invalidated, the memory block A may be used as the free block. Thus, the free block may be obtained without an additional garbage collection operation.

In case the mapping information with respect to the previous write data is invalidated (unmapped) by the overwrite operation in accordance with the write commands having non-successive logical addresses, when the unmapped physical address is concentrated on the specific memory block, the GC controller 20 may predict the invalidation of the specific memory block.

Figure 10:
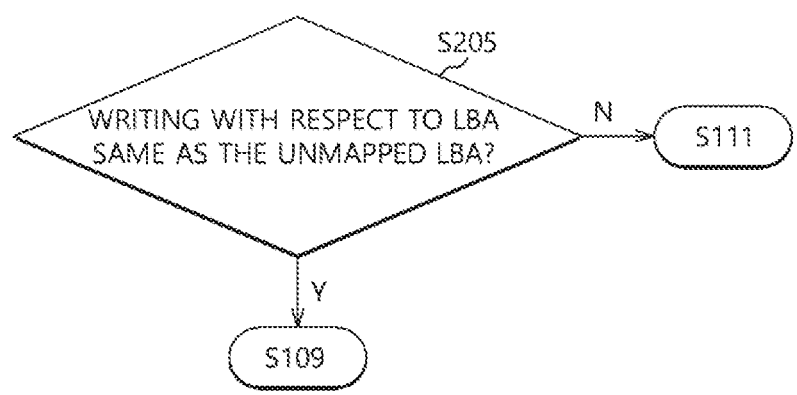
FIG. 10 is a diagram illustrating a method of predicting an invalidation of a memory block in accordance with an embodiment.
Figure 11A:
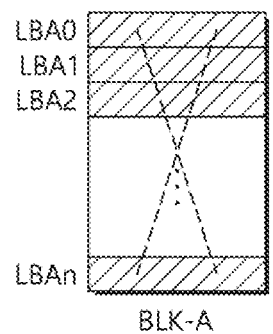
FIGS. 11A to 11C are diagram illustrating invalidation principles of a memory block in accordance with an embodiment.
Figure 11B:
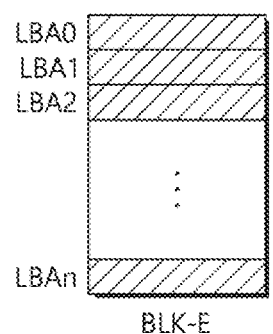
Figure 11C:
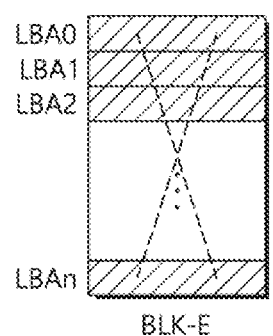

FIG. 10 is a diagram illustrating a method of predicting an invalidation of a memory block in accordance with an embodiment, and FIGS. 11A to 11C are diagrams illustrating invalidation principles of a memory block in accordance with an embodiment.

In an embodiment, when the overwrite with respect to the bulk data, previously invalidated after a writing operation, is requested in step S205, the GC controller 20 may predict the invalidation of the memory block in which the overwritten bulk data may be stored.

Referring to FIG. 6A, the memory block A (BLK-A) of the storage 120 may store data corresponding to logical addresses 0~n (LBA0~LBAn). Further, the storage 120 may include a plurality of the free blocks BLK-B, BLK-C, BLK-D and BLK-E.

Referring to FIG. 11A, all of the data in the memory block A BLK-A may be erased to unmap the logical addresses of the memory block A BLK-A.

By requesting the overwrite with respect to the same logical addresses LBA0~n, as shown in FIG. 11B, a write operation with respect to the memory block A BLK-A may be performed.

Because the data written in the memory block E BLK-E may be previously erased, as shown in FIG. 11C, the data in the memory block E may be identified to be erased later.

When the overwrite with respect to the bulk data having the previously erased record is requested, the garbage collection policy may be changed to prevent unnecessary garbage collection from being performed.

While methods for predicting the invalidation of the memory block in which previous data is stored before an overwrite have been described, various changes or modifications may be made consistent with the teachings herein.

According to an embodiment, invalidation of at least one memory block may be predicted by the overwrite. Thus, the garbage collection policy may be changed to prevent host command process capacity from being decreased by a background operation for housekeeping.

Figure 12:
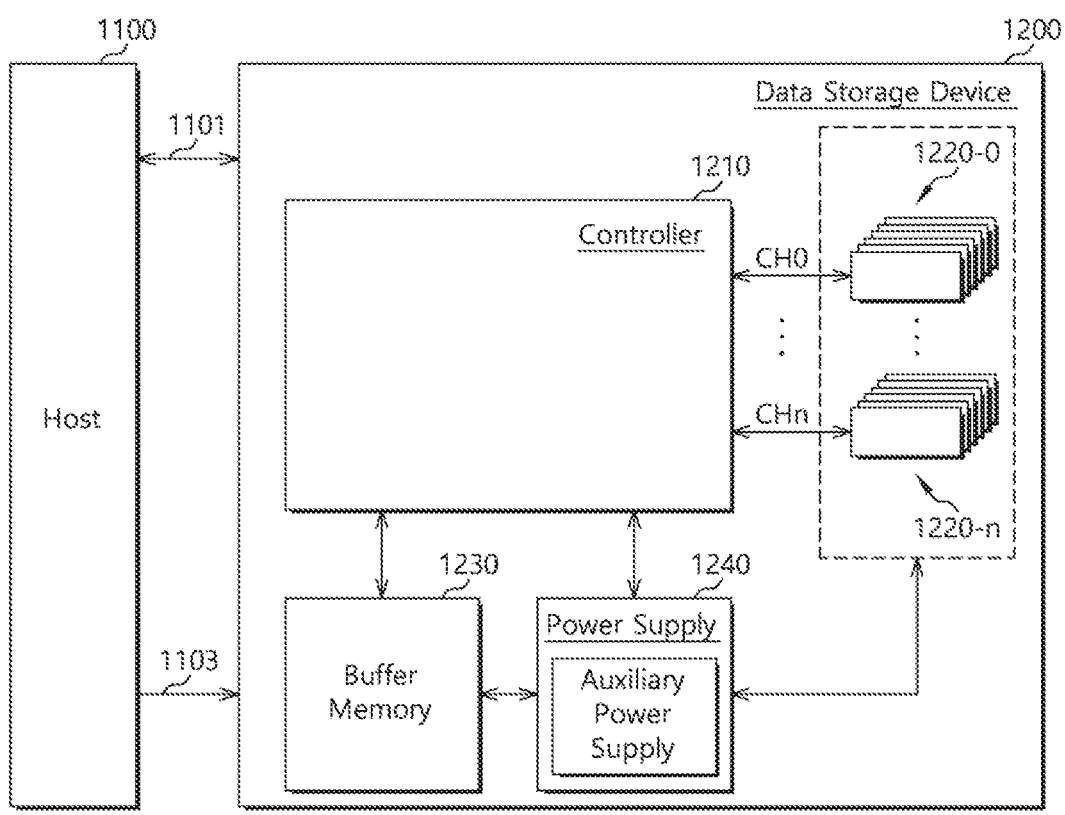
FIG. 12 is a diagram illustrating a data storage system in accordance with an embodiment.

FIG. 12 is a diagram illustrating a data storage system 1000 in accordance with an embodiment.

Referring to FIG. 12, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) circuit, and a memory interface. In an embodiment, the controller 1210 may be configured as controller 110 shown in FIGS. 1 and 2.

The host device 1100 may exchange a signal with the data storage device 1200 through the signal connector 1101. The signal may include a command, an address, and data.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n, and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 13:
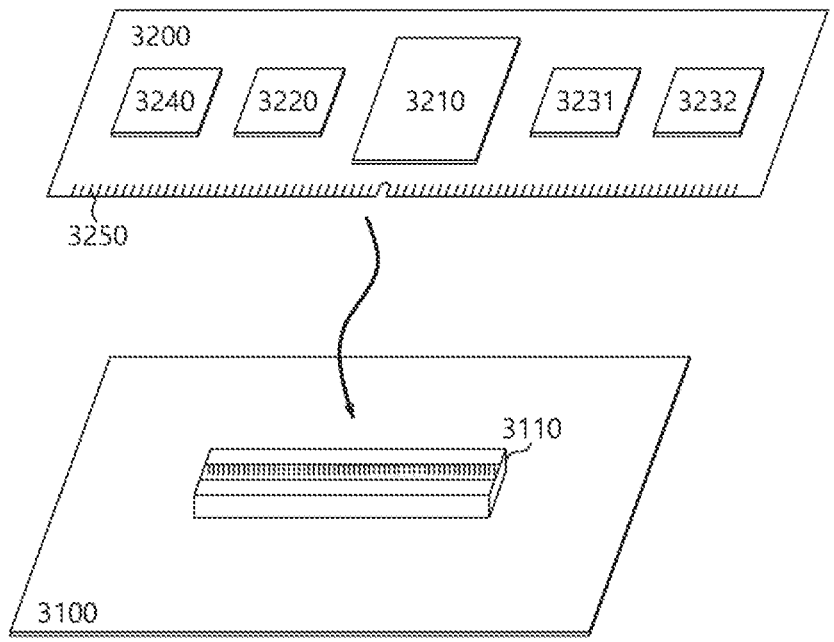
FIG. 13 and FIG. 14 are diagrams illustrating a data processing system in accordance with an embodiment.

FIG. 13 is a diagram illustrating a data processing system 3000, in accordance with an embodiment. Referring to FIG. 13, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 14:
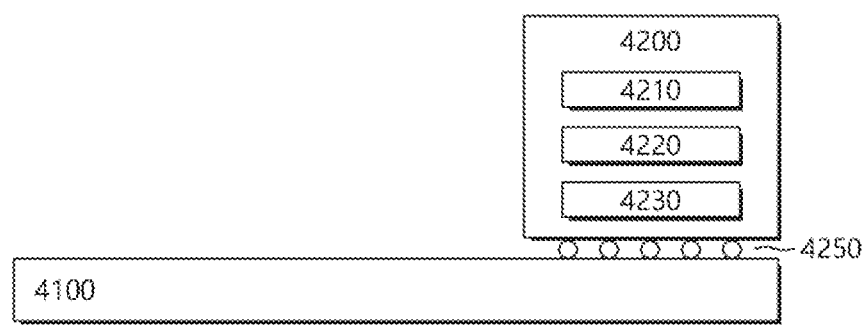

FIG. 14 is a diagram illustrating a data processing system 4000 in accordance with an embodiment. Referring to FIG. 14, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 15:
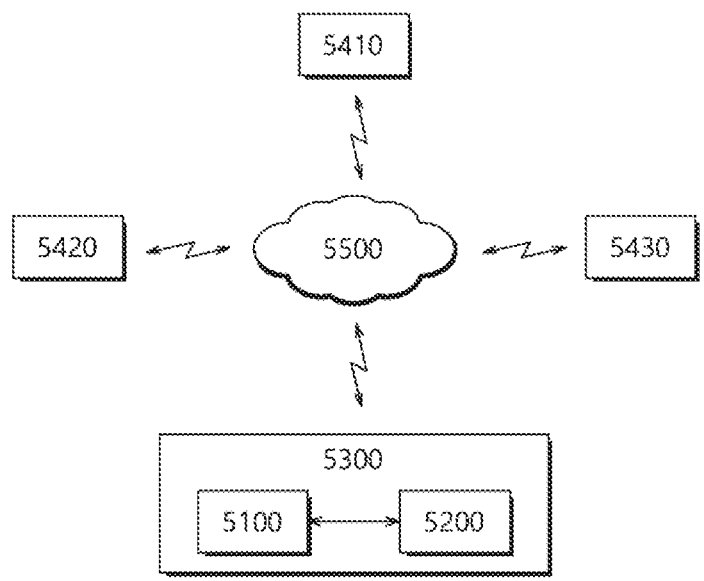
FIG. 15 is a diagram illustrating a network system including a data storage device in accordance with an embodiment.

FIG. 15 is a diagram illustrating a network system 5000 including a data storage device, in accordance with an embodiment. Referring to FIG. 15, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 12, the memory system 3200 shown in FIG. 13, or the memory system 4200 shown in FIG. 14.

Figure 16:
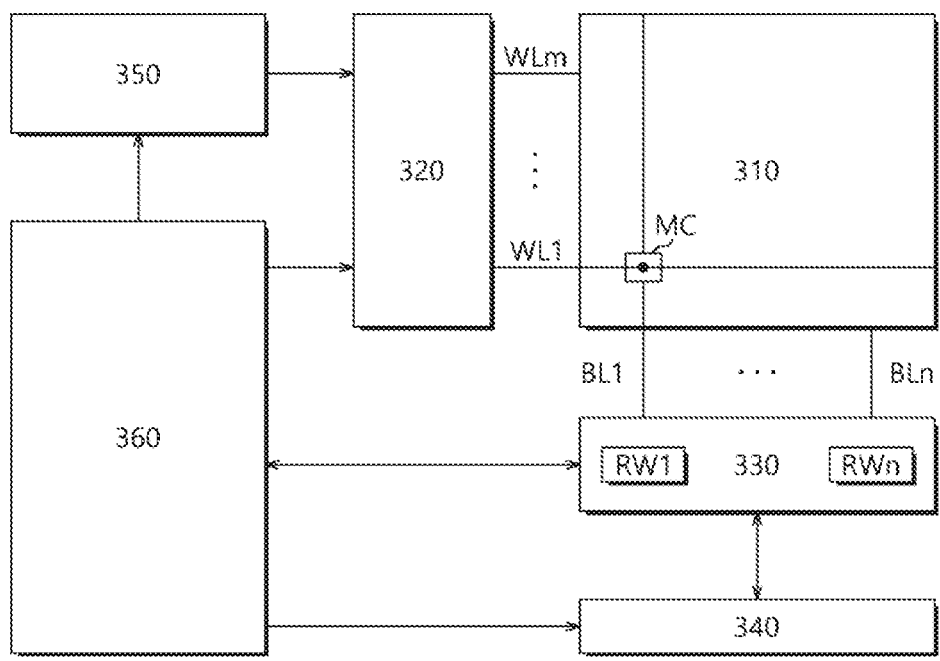
FIG. 16 is a block diagram illustrating a nonvolatile memory device included in a data storage device in accordance with an embodiment.

FIG. 16 is a block diagram illustrating a nonvolatile memory device 300 included in a data storage device, such as the data storage device 10, in accordance with an embodiment. Referring to FIG. 16, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending in a perpendicular direction to the flat surface of a semiconductor substrate. Moreover, the three-dimensional memory array means a structure including NAND strings in which memory cells are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged parallel as well as perpendicularly to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

The above described embodiments of the present invention are intended to illustrate, not to limit the present invention. Various alternatives and equivalents are possible. Not only is the invention not limited by the disclosed embodiments, the invention is not limited to any specific details nor to any specific type of semiconductor device. The present invention is intended to encompass all variations and modifications that fall within the scope of the appended claims.

What is claimed is:

1. A data storage device comprising:
    a storage; and
    a controller for controlling the storage,
    wherein the controller comprises a garbage collection (GC) control component that is configured to predict whether or not at least one memory block is to be invalidated based on a new write command with respect to a logical address having a previous write record, and to change a GC policy when the invalidation of the memory block is predicted, and
    wherein the GC policy comprises at least one of execution of GC, a GC trigger condition, and a number of free blocks to be collected by the GC, and
    wherein the at least one memory block predicted to be invalidated is a memory block obtained as a free memory block without a GC operation.

2. The data storage device of claim 1, wherein the GC control component is configured to determine whether a logical address in the new write command is maintained in a map table or is flagged as an unmapped state to identify the previous write record.

3. The data storage device of claim 1,
    wherein the new write command includes a plurality of new write commands, wherein the GC control component is configured to predict the invalidation of the at least one memory block when logical addresses included in the plurality of new write commands that are sequentially provided are consecutive and a size of data included in the plurality of new write commands is not less than a set size.

4. The data storage device of claim 1, wherein the GC control component predicts the invalidation of the at least one memory block when an invalidated amount of mapping information with respect to a specific memory block associated with the new write command is not less than a set amount.

5. The data storage device of claim 1, wherein the GC control component predicts the invalidation of the at least one memory block when an overwrite request with respect to bulk data having an invalidated record after a writing operation is received by the GC control component.

6. A controller for controlling a storage in response to a host device, the controller comprising:
    a record check component configured to determine a write record based on a map table based on a new write command received from the host device;
    a prediction component configured to predict whether or not at least one memory block is to be invalidated when the new write command with respect to a logical address has a write record as determined by the record check component; and
    a policy adjustment component configured to change a garbage collection (GC) policy when the prediction component predicts the invalidation of the at least one memory block,
    wherein the GC policy comprises at least one of execution of GC, a GC trigger condition, and a number of free blocks to be collected by the GC, and
    wherein the at least one memory block predicted to be invalidated is a memory block obtained as a free memory block without a GC operation.

7. The controller of claim 6, wherein the record check component is configured to determine whether the logical address in the new write command is maintained in the map table or is flagged with an unmapped state to identify the previous write record.

8. The controller of claim 6, wherein the new write command includes a plurality of new write commands, wherein the prediction component is configured to predict the invalidation of the at least one memory block when logical addresses included in the plurality of new write commands that are sequentially provided are consecutive and a size of data included in the plurality of new write commands is not less than a set size.

9. The controller of claim 6, wherein the prediction component is configured to predict the invalidation of the at least one memory block when an invalidated amount of mapping information with respect to a specific memory block associated with the new write command is not less than a set amount.

10. The controller of claim 6, wherein the prediction component is configured to predict the invalidation of the at least one memory block when an overwrite with respect to bulk data having an invalidated record after a writing operation is received by the GC controller.

11. A method of operating a data storage device including a storage and a controller for controlling the storage, the method comprising:
    determining, by the controller, whether or not a new write command corresponds to a write request with respect to a logical address having a previous write record based on the new write command provided from a host device;
    predicting, by the controller, whether or not at least one memory block is to be invalidated when the new write command corresponds to the write request with respect to the logical address having the previous write record; and changing, by the controller, a garbage collection (GC) policy when the invalidation of the at least one memory block is predicted, wherein the GC policy comprises at least one of execution of GC, a GC trigger condition, and a number of free blocks to be collected by the GC, and wherein the at least one memory block predicted to be invalidated is a memory block obtained as a free memory block without a GC operation.

12. The method of claim 11, wherein determining whether or not the new write command corresponds to the write request comprises determining whether a logical address in the new write command is maintained in a map table or is flagged with an unmapped state to identify the previous write record by the controller.

13. The method of claim 11, wherein the new write command includes a plurality of new write commands, wherein predicting whether or not the at least one memory block is to be invalidated comprises predicting the invalidation of the at least one memory block when logical addresses included in the plurality of new write commands that are sequentially provided are consecutive and a size of data included in the plurality of new write commands is not less than a set size.

14. The method of claim 11, wherein predicting whether or not the at least one memory block is to be invalidated comprises predicting the invalidation of the at least one memory block when an invalidated amount of mapping information with respect to a specific memory block associated with the new write command is not less than a set amount.

15. The method of claim 11, wherein predicting whether or not the at least one memory block is to be invalidated comprises predicting the invalidation of the at least one memory block when an overwrite request with respect to bulk data having an invalidated record after a writing operation is received by the GC controller.

* * * * *